(12) United States Patent
Suyama

(10) Patent No.: US 12,027,883 B2
(45) Date of Patent: Jul. 2, 2024

(54) OPTICAL POWER SUPPLY SYSTEM WITH ADJUSTMENT OF FEED LIGHT SUPPLY BASED ON ELECTRIC POWER CONSUMPTION

(71) Applicant: KYOCERA CORPORATION, Kyoto (JP)

(72) Inventor: Takehiko Suyama, Yamato (JP)

(73) Assignee: KYOCERA CORPORATION, Kyoto (JP)

( * ) Notice: Subject to any disclaimer, the term of this patent is extended or adjusted under 35 U.S.C. 154(b) by 219 days.

(21) Appl. No.: 17/612,219

(22) PCT Filed: Jun. 10, 2020

(86) PCT No.: PCT/JP2020/022786
§ 371 (c)(1),
(2) Date: Nov. 18, 2021

(87) PCT Pub. No.: WO2020/261987
PCT Pub. Date: Dec. 30, 2020

(65) Prior Publication Data
US 2022/0311282 A1    Sep. 29, 2022

(30) Foreign Application Priority Data
Jun. 26, 2019 (JP) .................... 2019-117970

(51) Int. Cl.
*H02J 50/30* (2016.01)
*H01S 3/10* (2006.01)
(Continued)

(52) U.S. Cl.
CPC .......... *H02J 50/30* (2016.02); *H01S 3/10046* (2013.01); *H02J 50/80* (2016.02); *H04B 10/806* (2013.01); *H04B 10/807* (2013.01)

(58) Field of Classification Search
CPC ......... H02J 50/30; H02J 50/80; H01S 3/0046; H04B 10/806; H04B 10/807
See application file for complete search history.

(56) References Cited

U.S. PATENT DOCUMENTS

| | | | |
|---|---|---|---|
| 2011/0280586 A1* | 11/2011 | Chan | H04B 10/807 359/237 |
| 2019/0064353 A1* | 2/2019 | Nugent, Jr. | H04B 10/807 |
| 2020/0381955 A1* | 12/2020 | Soryal | H02J 50/80 |

FOREIGN PATENT DOCUMENTS

| | | |
|---|---|---|
| JP | H10510418 A | 10/1998 |
| JP | H1189120 A | 3/1999 |
| JP | 2010135989 A | 6/2010 |

OTHER PUBLICATIONS

Motoharu Matsuura et al., Bidirectional Radio-Over-Fiber Systems Using Double-Clad Fibers for Optically Powered Remote Antenna Units, IEEE Photonics Journal, Feb. 1, 2015, vol. 7, No. 1, 10pp.

* cited by examiner

*Primary Examiner* — Jennifer D Bennett
(74) *Attorney, Agent, or Firm* — HAUPTMAN HAM, LLP

(57) ABSTRACT

An optical power supply system includes a power sourcing equipment, a powered device and a control device. The power sourcing equipment includes a semiconductor laser that oscillates with electric power and performs pulsed output of feed light. The powered device includes a photoelectric conversion element that converts the feed light into electric power. The control device adjusts a supply amount of the feed light to be supplied from the semiconductor laser by a pulse width of the feed light according to a consumption of the electric power obtained by the conversion by the powered device.

19 Claims, 6 Drawing Sheets

(51) Int. Cl.
*H02J 50/80* (2016.01)
*H04B 10/80* (2013.01)

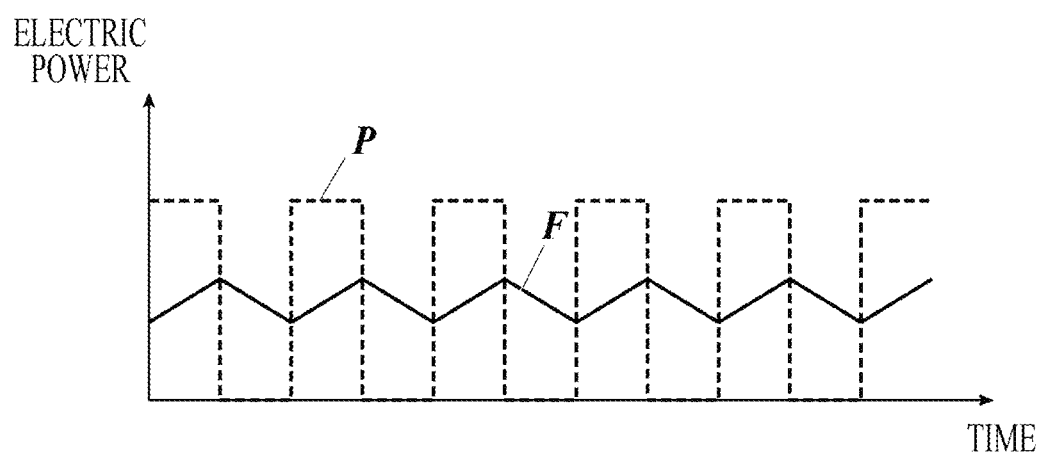

OPTICAL POWER SUPPLY SYSTEM WITH ADJUSTMENT OF FEED LIGHT SUPPLY BASED ON ELECTRIC POWER CONSUMPTION

RELATED APPLICATIONS

The present application is a National Phase of International Application No. PCT/JP2020/022786 filed Jun. 10, 2020, which claims priority to Japanese Application No. 2019-117970, filed Jun. 26, 2019.

TECHNICAL FIELD

The present disclosure relates to an optical power supply system.

BACKGROUND ART

Recently, there has been studied an optical power supply system that converts electric power into light (called feed light), transmits the feed light, converts the feed light into electric energy, and uses the electric energy as electric power.

There is disclosed in Patent Literature 1 an optical communication device that includes: an optical transmitter that transmits signal light modulated with an electric signal and feed light for supplying electric power; an optical fiber including a core that transmits the signal light, a first cladding that is formed around the core, has a refractive index lower than that of the core, and transmits the feed light, and a second cladding that is formed around the first cladding, and has a refractive index lower than that of the first cladding; and an optical receiver that operates with electric power obtained by converting the feed light transmitted through the first cladding of the optical fiber, and converts the signal light transmitted through the core of the optical fiber into the electric signal.

CITATION LIST

Patent Literature

Patent Literature 1: JP 2010-135989 A

SUMMARY OF INVENTION

Problem to Solve

In optical power supply, further improvement of optical power supply efficiency is required. As one way therefor, improvement of photoelectric conversion efficiency at the power supplying side and the power receiving side is required.

Solution to Problem

A power over fiber system according to an aspect of the present disclosure includes:
a power sourcing equipment including a semiconductor laser that oscillates with electric power and performs pulsed output of feed light;
a powered device including a photoelectric conversion element that converts the feed light into electric power; and
a control device that adjusts a supply amount of the feed light to be supplied from the semiconductor laser by a pulse width of the feed light according to a consumption of the electric power obtained by the conversion by the powered device.

BRIEF DESCRIPTION OF DRAWINGS

FIG. 6 is a line graph showing output electric power of a photoelectric conversion element and output electric power of an electric power smoothing device.

DESCRIPTION OF EMBODIMENTS

Hereinafter, embodiments of the present disclosure will be described with reference to the drawings.

(1) Outline of System

First Embodiment

Figure 1:
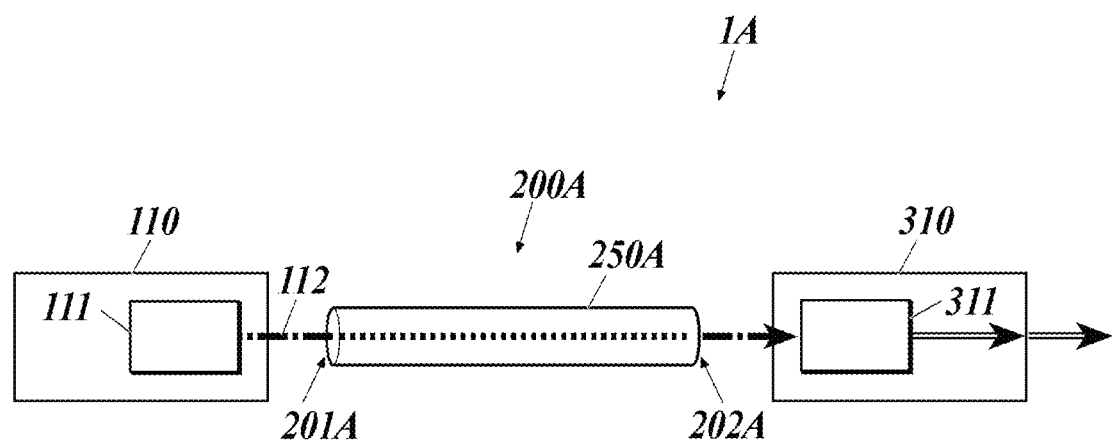
FIG. 1 is a block diagram of a power over fiber system according to a first embodiment of the present disclosure.

As shown in FIG. 1, a power over fiber (PoF) system 1A as an optical power supply system of this embodiment includes a power sourcing equipment (PSE) 110, an optical fiber cable 200A and a powered device (PD) 310.

In the present disclosure, a power sourcing equipment converts electric power into optical energy and supplies (sources) the optical energy, and a powered device receives (draws) the supplied optical energy and converts the optical energy into electric power.

The power sourcing equipment 110 includes a semiconductor laser 111 for power supply.

The optical fiber cable 200A includes an optical fiber 250A that forms a transmission path of feed light.

The powered device 310 includes a photoelectric conversion element 311.

The power sourcing equipment 110 is connected to a power source, and electrically drives the semiconductor laser 111 and so forth.

The semiconductor laser 111 oscillates with the electric power from the power source, thereby outputting feed light 112.

The optical fiber cable 200A has one end 201A connectable to the power sourcing equipment 110 and the other end 202A connectable to the powered device 310 to transmit the feed light 112.

The feed light 112 from the power sourcing equipment 110 is input to the one end 201A of the optical fiber cable 200A, propagates through the optical fiber 250A, and is output from the other end 202A of the optical fiber cable 200A to the powered device 310.

The photoelectric conversion element 311 converts the feed light 112 transmitted through the optical fiber cable 200A into electric power. The electric power obtained by the conversion of the feed light 112 by the photoelectric conversion element 311 is driving power needed in the powered device 310. The powered device 310 is capable of outputting, for an external device(s), the electric power obtained by the conversion of the feed light 112 by the photoelectric conversion element 311.

Semiconductor materials of semiconductor regions of the semiconductor laser 111 and the photoelectric conversion element 311 are semiconductors having a laser wavelength being a short wavelength of 500 nm or less. The semiconductor regions exhibit light-electricity conversion effect.

Semiconductors having a laser wavelength being a short wavelength have a large band gap and a high photoelectric conversion efficiency, and hence improve photoelectric conversion efficiency at the power supplying side and the power receiving side in optical power supply, and improve optical power supply efficiency.

Hence, as the semiconductor materials, laser media having a laser wavelength (base wave) of 200 nm to 500 nm may be used. Examples thereof include diamond, gallium oxide, aluminum nitride and gallium nitride.

Further, as the semiconductor materials, semiconductors having a band gap of 2.4 eV or greater are used.

For example, laser media having a band gap of 2.4 eV to 6.2 eV may be used. Examples thereof include diamond, gallium oxide, aluminum nitride and gallium nitride.

Laser light having a longer wavelength tends to have a higher transmission efficiency, whereas laser light having a shorter wavelength tends to have a higher photoelectric conversion efficiency. Hence, when laser light is transmitted for a long distance, laser media having a laser wavelength (base wave) of greater than 500 nm may be used as the semiconductor materials, whereas when the photoelectric conversion efficiency is given priority, laser media having a laser wavelength (base wave) of less than 200 nm may be used as the semiconductor materials.

Any of these semiconductor materials may be used in one of the semiconductor laser 111 and the photoelectric conversion element 311. This improves the photoelectric conversion efficiency at either the power supplying side or the power receiving side, and improves the optical power supply efficiency.

Second Embodiment

Figure 2:
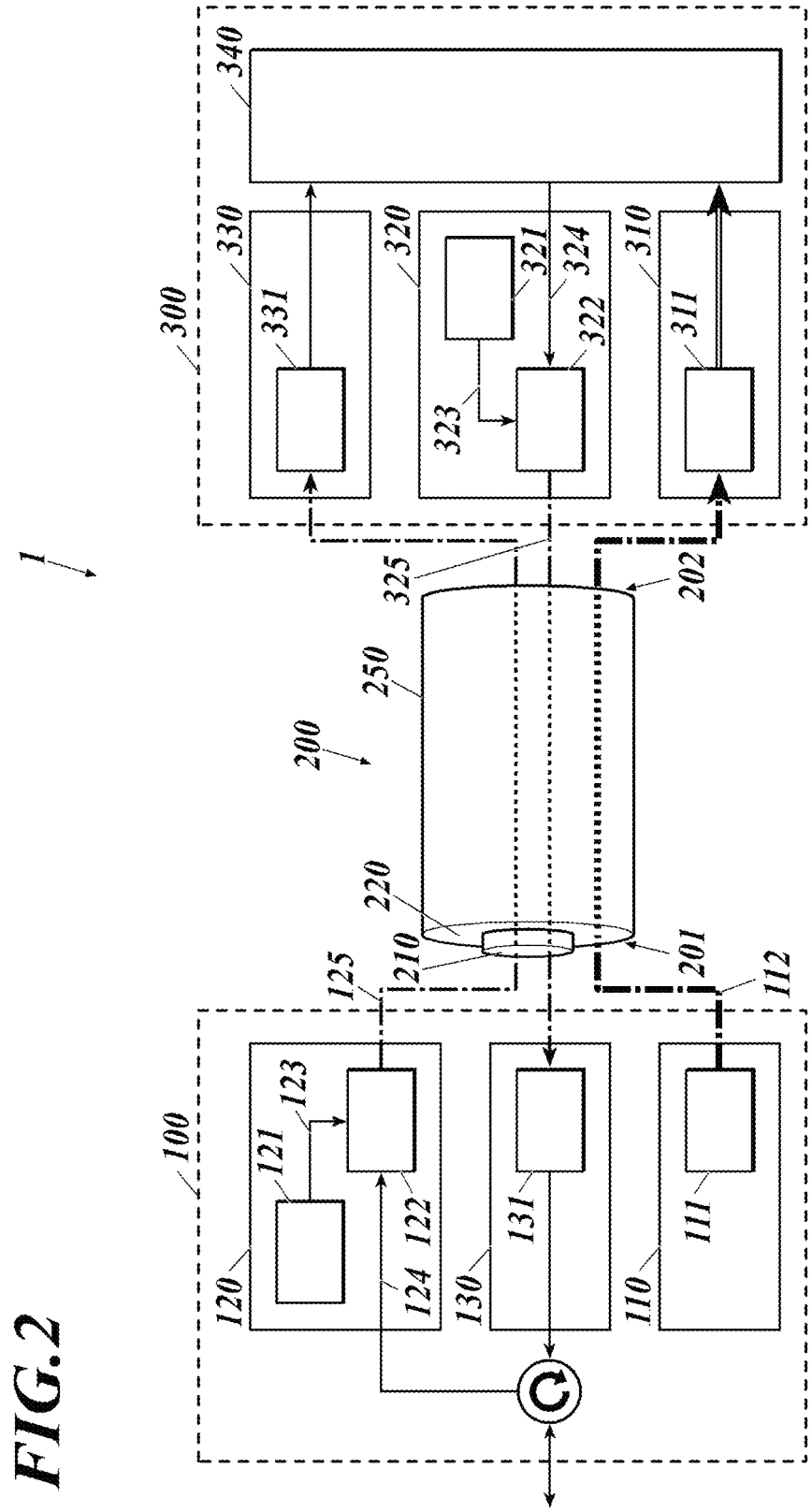
FIG. 2 is a block diagram of a power over fiber system according to a second embodiment of the present disclosure.

As shown in FIG. 2, a power over fiber (PoF) system 1 as an optical power supply system of this embodiment includes an optical power supply system through an optical fiber and an optical communication system therethrough, and includes: a first data communication device 100 including a power sourcing equipment (PSE) 110; an optical fiber cable 200; and a second data communication device 300 including a powered device (PD) 310.

In the following description, as a general rule, components donated by the same reference signs as those of already-described components are the same as the already-described components unless otherwise stated.

The power sourcing equipment 110 includes a semiconductor laser 111 for power supply. The first data communication device 100 includes, in addition to the power sourcing equipment 110, a transmitter 120 and a receiver 130 for data communication. The first data communication device 100 corresponds to a data terminal equipment (DTE), a repeater or the like. The transmitter 120 includes a semiconductor laser 121 for signals and a modulator 122. The receiver 130 includes a photodiode 131 for signals.

The optical fiber cable 200 includes an optical fiber 250 including: a core 210 that forms a transmission path of signal light; and a cladding 220 that is arranged so as to surround the core 210 and forms a transmission path of feed light.

The powered device 310 includes a photoelectric conversion element 311. The second data communication device 300 includes, in addition to the powered device 310, a transmitter 320, a receiver 330 and a data processing unit 340. The second data communication device 300 corresponds to a power end station or the like. The transmitter 320 includes a semiconductor laser 321 for signals and a modulator 322. The receiver 330 includes a photodiode 331 for signals. The data processing unit 340 processes received signals. The second data communication device 300 is a node in a communication network. The second data communication device 300 may be a node that communicates with another node.

The first data communication device 100 is connected to a power source, and electrically drives the semiconductor laser 111, the semiconductor laser 121, the modulator 122, the photodiode 131 and so forth. The first data communication device 100 is a node in a communication network. The first data communication device 100 may be a node that communicates with another node.

The semiconductor laser 111 oscillates with the electric power from the power source, thereby outputting feed light 112.

The photoelectric conversion element 311 converts the feed light 112 transmitted through the optical fiber cable 200 into electric power. The electric power obtained by the conversion of the feed light 112 by the photoelectric conversion element 311 is driving power needed in the second data communication device 300, for example, driving power for the transmitter 320, the receiver 330 and the data processing unit 340. The second data communication device 300 may be capable of outputting, for an external device(s), the electric power obtained by the conversion of the feed light 112 by the photoelectric conversion element 311.

The modulator 122 of the transmitter 120 modulates laser light 123 output by the semiconductor laser 121 to signal light 125 on the basis of transmission data 124, and outputs the signal light 125.

The photodiode 331 of the receiver 330 demodulates the signal light 125 transmitted through the optical fiber cable 200 to an electric signal, and outputs the electric signal to the data processing unit 340. The data processing unit 340 transmits data of the electric signal to a node, and also receives data from the node and outputs the data to the modulator 322 as transmission data 324.

The modulator 322 of the transmitter 320 modulates laser light 323 output by the semiconductor laser 321 to signal light 325 on the basis of the transmission data 324, and outputs the signal light 325.

The photodiode 131 of the receiver 130 demodulates the signal light 325 transmitted through the optical fiber cable 200 to an electric signal, and outputs the electric signal. Data of the electric signal is transmitted to a node, whereas data from the node is the transmission data 124.

The feed light 112 and the signal light 125 from the first data communication device 100 are input to one end 201 of the optical fiber cable 200, propagate through the cladding 220 and the core 210, respectively, and are output from the other end 202 of the optical fiber cable 200 to the second data communication device 300.

The signal light 325 from the second data communication device 300 is input to the other end 202 of the optical fiber cable 200, propagates through the core 210, and is output from the one end 201 of the optical fiber cable 200 to the first data communication device 100.

Figure 3:
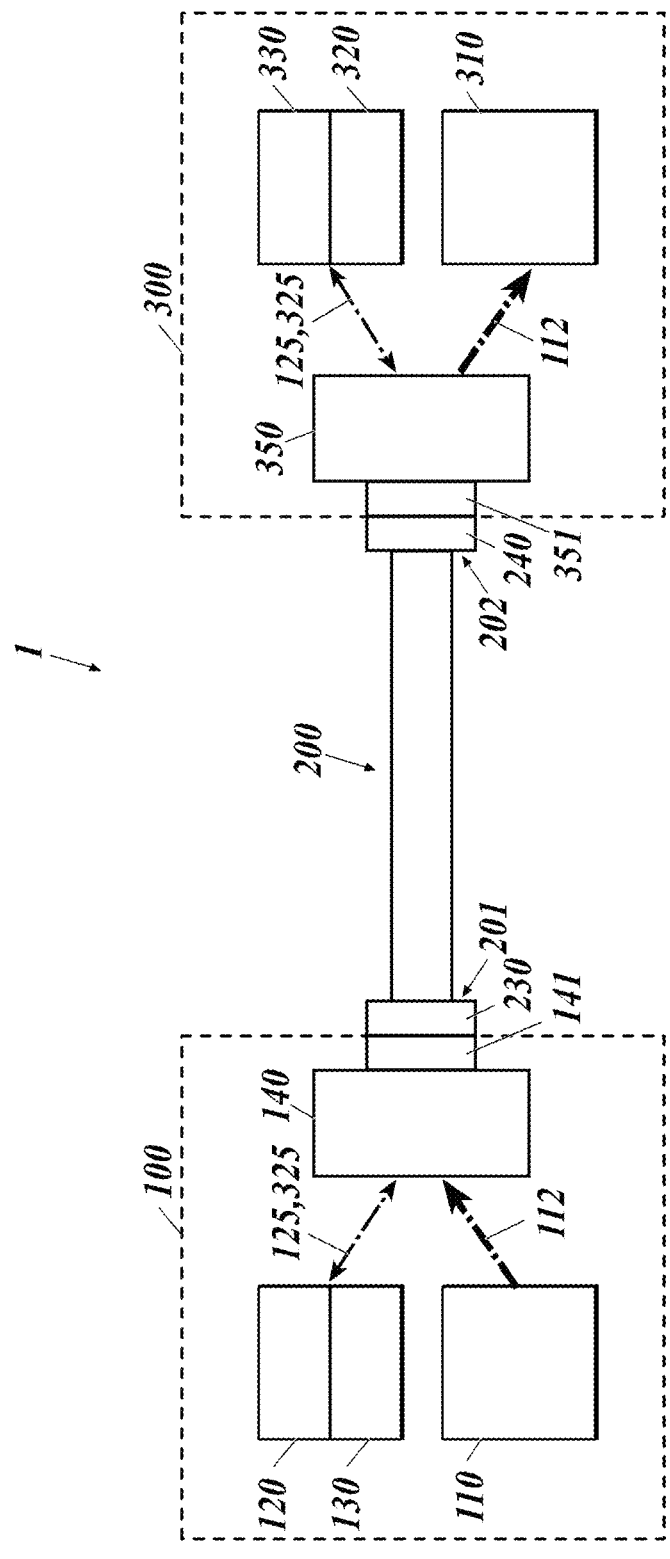
FIG. 3 is a block diagram of the power over fiber system according to the second embodiment of the present disclosure and shows optical connectors and so forth.

As shown in FIG. 3, the first data communication device 100 includes a light input/output part 140 and an optical connector 141 attached to the light input/output part 140, and the second data communication device 300 includes a light input/output part 350 and an optical connector 351 attached to the light input/output part 350. An optical connector 230 provided at the one end 201 of the optical fiber cable 200 is connected to the optical connector 141, and an optical connector 240 provided at the other end 202 of the optical fiber cable 200 is connected to the optical connector 351. The light input/output part 140 guides the feed light 112 to the cladding 220, guides the signal light 125 to the core 210, and guides the signal light 325 to the receiver 130. The light input/output part 350 guides the feed light 112 to the powered device 310, guides the signal light 125 to the receiver 330, and guides the signal light 325 to the core 210.

As described above, the optical fiber cable 200 has the one end 201 connectable to the first data communication device 100 and the other end 202 connectable to the second data communication device 300 to transmit the feed light 112. In this embodiment, the optical fiber cable 200 transmits the signal light 125, 325 bidirectionally.

As the semiconductor materials of the semiconductor regions, which exhibit the light-electricity conversion effect, of the semiconductor laser 111 and the photoelectric conversion element 311, any of those described in the first embodiment can be used, thereby achieving a high optical power supply efficiency.

Figure 4:
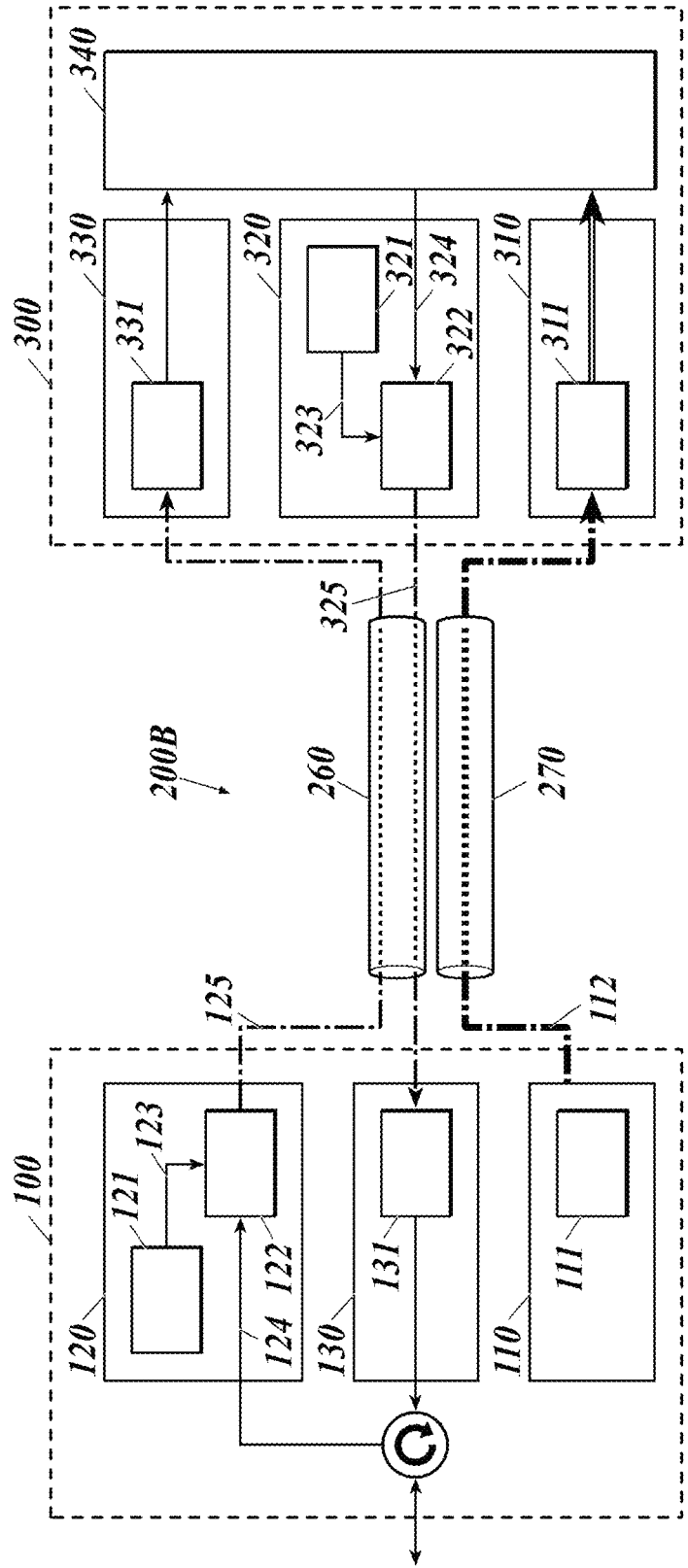
FIG. 4 is a block diagram of a power over fiber system according to another embodiment of the present disclosure.

Like an optical fiber cable 200B of a power over fiber system 1B as an optical power supply system shown in FIG. 4, an optical fiber 260 that transmits signal light and an optical fiber 270 that transmits feed light may be provided separately. Further, the optical fiber cable 200B may be composed of a plurality of optical fiber cables.

(2) Components for Semiconductor Laser for Power Supply to Perform Pulsed Output Next, components for a semiconductor laser for power supply to perform pulsed output will be described with reference to FIG. 5.

Figure 5:
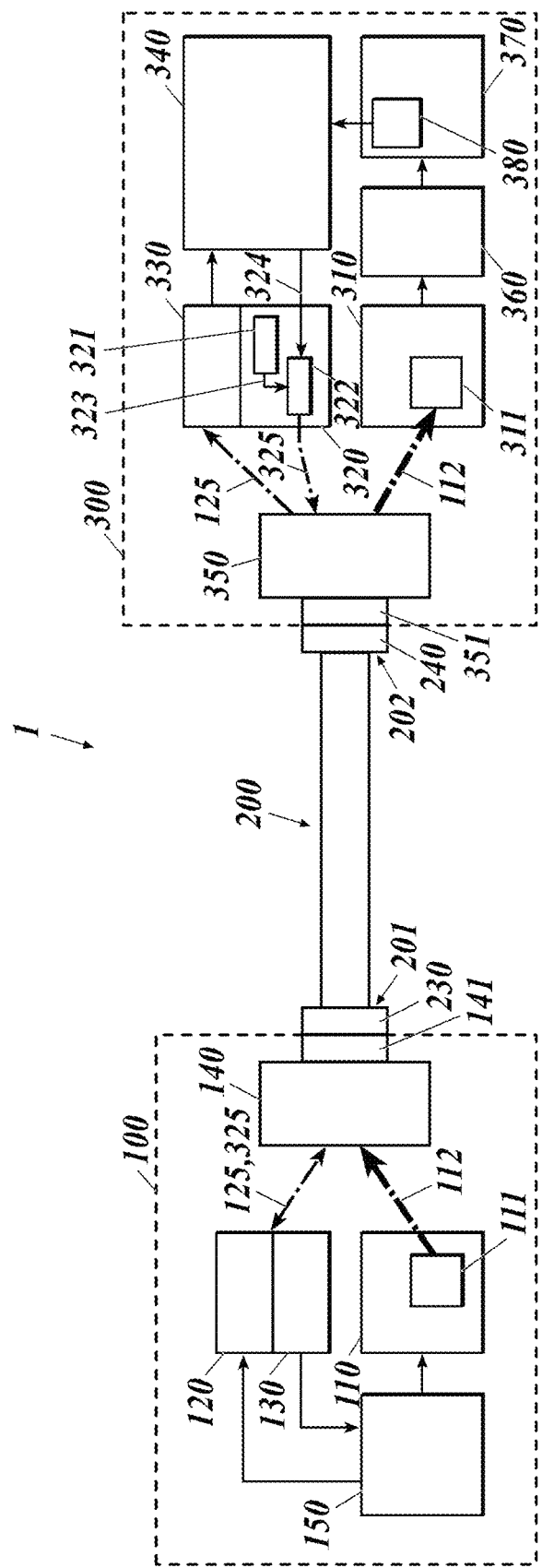
FIG. 5 is a block diagram of the power over fiber system according to the second embodiment of the present disclosure with components for a semiconductor laser for power supply to perform pulsed output added.

FIG. 5 is a block diagram of the power over fiber system 1 in which the semiconductor laser 111 performs pulsed output.

In the following description, as a general rule, components donated by the same reference signs as those of already-described components are the same as the already-described components unless otherwise stated.

In order for the semiconductor laser 111 of the first data communication device 100 to perform pulsed output, for example, a control device 150 is provided to switch an excitation source of the semiconductor laser 111 between ON (light-up state) and OFF (light-off state).

The control device 150 continuously repeats a certain cycle of ON and OFF that alternate, and also performs PWM (Pulse Width Modulation) control to adjust the output by increasing or decreasing a percentage of the ON period (duty cycle).

The control device 150 may be configured by a microcomputer or a sequencer using an analog circuit or a digital circuit.

The photoelectric conversion element 311 of the second data communication device 300 receives the pulsed-output feed light 112 and outputs electric power pulsatively as indicated by a dotted line P in FIG. 6.

As shown in FIG. 5, the photoelectric conversion element 311 is provided with an electric power smoothing device 360 that smooths the pulsed-output electric power. The electric power smoothing device 360 includes a smoothing circuit to smooth the electric power, which repeats ON and OFF regularly, thereby converting the electric power into smooth electric power that repeats gradual increase and gradual decrease regularly as indicated by a solid line F in FIG. 6, and input the smooth electric power to a load 370, which is a component of the second data communication device 300, an external device or the like, as an electric power supply destination. The electric power smoothing device 360 may be configured by having a smoothing circuit capable of outputting electric power that hardly increases or decreases, thereby being almost constant.

The second data communication device 300 includes a detector 380 that detects the consumption of electric power (electric power consumption) in the load 370 as a consumption destination that consumes the electric power output thereto from the powered device 310 through the electric power smoothing device 360.

The detector 380 may be configured to detect the electric power consumption with a current detecting resistor that detects current flowing in the load 370, may be configured to detect the electric power consumption from magnetic flux density of a magnetic core disposed around a path of the current flowing in the load 370, or may utilize various other well-known components that detect electric power.

The electric power consumption in the load 370 detected by the detector 380 is input to the data processing unit 340.

The data processing unit 340 puts, in the transmission data 324, the electric power consumption in the load 370 detected by the detector 380 and outputs the transmission data 324 to the modulator 322 of the transmitter 320. The modulator 322 of the transmitter 320 modulates the laser light 323, which is from the semiconductor laser 321, to the signal light 325 on the basis of the transmission data 324, and outputs the signal light 325.

The above-described control device 150 of the first data communication device 100 obtains, from the receiver 130, the transmission data 324 to which the signal light 325 transmitted from the transmitter 320 has been demodulated, and reads the electric power consumption in the load 370 put in the transmission data 324. Then, the control device 150 performs control to adjust the output of the semiconductor laser 111 by increasing or decreasing the duty cycle of the semiconductor laser 111 according to the electric power consumption in the load 370.

For example, if the electric power consumption at the second data communication device 300 side decreases or is smaller than a specified value, the control device 150 reduces the laser output of the semiconductor laser 111 to reduce the amount of electric power to be supplied (electric power supply amount) to the second data communication device 300 side. Also, if the electric power consumption at the second data communication device 300 side increases or is larger than the specified value, the control device 150 increases the laser output of the semiconductor laser 111 to increase the electric power supply amount to the second data communication device 300 side.

Thus, in the power over fiber system 1 shown in FIG. 5, the semiconductor laser 111 performs pulsed output of the feed light. This enables easy control of the electric power supply amount while keeping the laser wavelength constant. For example, changing the duty cycle of the pulsed output of the feed light, which is performed by the semiconductor laser 111, can increase or decrease the electric power supply amount proportionally, thereby enabling more appropriate control of the electric power supply amount.

Further, the control device 150 adjusts the amount (supply amount) of the feed light 112 to be supplied from the semiconductor laser 111 according to the electric power consumption detected at the powered device 310 or load 370 side. This enables power supply with an appropriate supply amount according to the electric power consumed, can reduce an electric power supply amount that becomes an excess at the powered device 310, and can improve the optical power supply efficiency.

Further, the powered device 310 is provided with the electric power smoothing device 360 that smooths the electric power obtained by the conversion by the powered device 310. This enables stable electric power supply with little fluctuation.

Although FIG. 5 shows an example in which the components for the semiconductor laser for power supply to perform the pulsed output are applied to the power over fiber system 1, in the same manner as that shown in FIG. 5, the components for the semiconductor laser for power supply to perform the pulsed output can be applied to the power over fiber system 1B.

Although some embodiments of the present disclosure have been described above, these embodiments are made for purposes of illustration and example only. The present invention can be carried out in various other forms, and each component may be omitted, replaced or modified/changed within a range not departing from the scope of the present invention.

INDUSTRIAL APPLICABILITY

An optical power supply system according to the present invention has industrial applicability to an optical power supply system in which power supply is performed with pulsed-output feed light.

The invention claimed is:

1. An optical power supply system, comprising:
a power sourcing equipment including a semiconductor laser configured to oscillate with electric power and perform pulsed output of feed light;
a powered device including a data processing unit and a photoelectric conversion element configured to convert the feed light into electric power, the powered device being configured to output the electric power obtained by the conversion by the powered device to an external device; and
a control device configured to adjust a supply amount of the feed light to be supplied from the semiconductor laser by a pulse width of the feed light according to a consumption of the electric power in the external device,
wherein
the external device includes a detector configured to directly detect the consumption of the electric power in the external device,
the data processing unit of the powered device is configured to:
receive data indicating an amount of the consumption of the electric power from the external device; and
transmit the data to the control device, and
the control device is further configured to:
receive the data; and
adjust the supply amount of the feed light according to a comparison between the amount of the consumption of the electric power and a threshold.

2. The optical power supply system according to claim 1, wherein the control device is configured to adjust the supply amount by changing a duty cycle of the semiconductor laser that is configured to perform the pulsed output.

3. The optical power supply system according to claim 1, wherein the powered device is provided with a smoothing circuit configured to smooth the electric power obtained by the conversion.

4. The optical power supply system according to claim 1, wherein
the semiconductor laser includes a semiconductor material in a semiconductor region of the semiconductor laser,
the semiconductor region exhibits a light-electricity conversion effect, and
the semiconductor material is a laser medium having a laser wavelength of 500 nm or less.

5. The optical power supply system according to claim 1, wherein
the photoelectric conversion element includes a semiconductor material in a semiconductor region of the photoelectric conversion element,
the semiconductor region exhibits a light-electricity conversion effect, and
the semiconductor material is a medium having a laser wavelength of 500 nm or less.

6. The optical power supply system according to claim 2, wherein the powered device is provided with a smoothing circuit configured to smooth the electric power obtained by the conversion.

7. The optical power supply system according to claim 2, wherein
the semiconductor laser includes a semiconductor material in a semiconductor region of the semiconductor laser,
the semiconductor region exhibits a light-electricity conversion effect, and
the semiconductor material is a laser medium having a laser wavelength of 500 nm or less.

8. The optical power supply system according to claim 3, wherein
the semiconductor laser includes a semiconductor material in a semiconductor region of the semiconductor laser,
the semiconductor region exhibits a light-electricity conversion effect, and
the semiconductor material is a laser medium having a laser wavelength of 500 nm or less.

9. The optical power supply system according to claim 6, wherein
the semiconductor laser includes a semiconductor material in a semiconductor region of the semiconductor laser,
the semiconductor region exhibits a light-electricity conversion effect, and
the semiconductor material is a laser medium having a laser wavelength of 500 nm or less.

10. The optical power supply system according to claim 2, wherein
the photoelectric conversion element includes a semiconductor material in a semiconductor region of the photoelectric conversion element,
the semiconductor region exhibits a light-electricity conversion effect, and
the semiconductor material is a medium having a laser wavelength of 500 nm or less.

11. The optical power supply system according to claim 3, wherein
the photoelectric conversion element includes a semiconductor material in a semiconductor region of the photoelectric conversion element, the semiconductor region exhibits a light-electricity conversion effect, and the semiconductor material is a medium having a laser wavelength of 500 nm or less.

12. The optical power supply system according to claim 6, wherein the photoelectric conversion element includes a semiconductor material in a semiconductor region of the photoelectric conversion element, the semiconductor region exhibits a light-electricity conversion effect, and the semiconductor material is a medium having a laser wavelength of 500 nm or less.

13. The optical power supply system according to claim 4, wherein the photoelectric conversion element includes a semiconductor material in a semiconductor region of the photoelectric conversion element, the semiconductor region exhibits a light-electricity conversion effect, and the semiconductor material is a medium having a laser wavelength of 500 nm or less.

14. The optical power supply system according to claim 7, wherein the photoelectric conversion element includes a semiconductor material in a semiconductor region of the photoelectric conversion element, the semiconductor region exhibits a light-electricity conversion effect, and the semiconductor material is a medium having a laser wavelength of 500 nm or less.

15. The optical power supply system according to claim 8, wherein the photoelectric conversion element includes a semiconductor material in a semiconductor region of the photoelectric conversion element, the semiconductor region exhibits a light-electricity conversion effect, and the semiconductor material is a medium having a laser wavelength of 500 nm or less.

16. The optical power supply system according to claim 9, wherein the photoelectric conversion element includes a semiconductor material in a semiconductor region of the photoelectric conversion element, the semiconductor region exhibits a light-electricity conversion effect, and the semiconductor material is a medium having a laser wavelength of 500 nm or less.

17. The optical power supply system according to claim 1, comprising:

a first data communication device including the power sourcing equipment and the control device;

a second data communication device including the powered device and the external device; and an optical fiber cable in communication with the first data communicate device and the second data communication device.

18. The optical power supply system according to claim 17, wherein the control device of the first data communication device is configured to obtain the data transmitted via the optical fiber cable from the data processing unit of the powered device in the second data communication device.

19. The optical power supply system according to claim 1, wherein the control device is configured to:

in adjusting the supply amount of the feed light, increase the supply amount in response to the amount of the consumption of the electric power being larger than the threshold, and decrease the supply amount in response to the amount of the consumption of the electric power being lower than the threshold.

* * * * *